March 1, 1955 A. R. HARRIS 2,702,993
HERMETIC CONNECTOR
Filed July 24, 1951
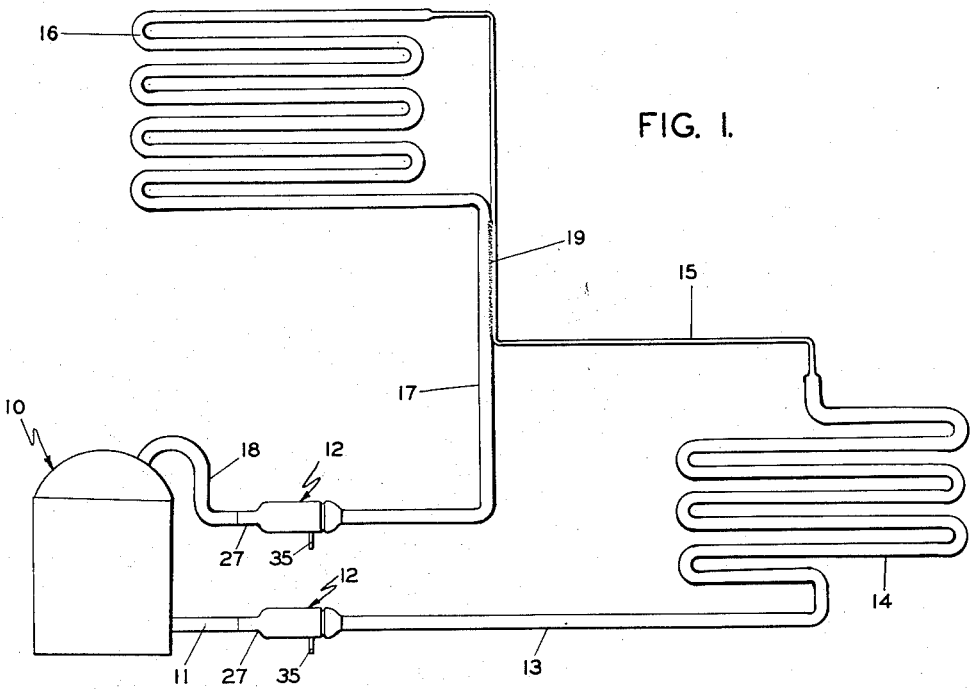
FIG. 1.
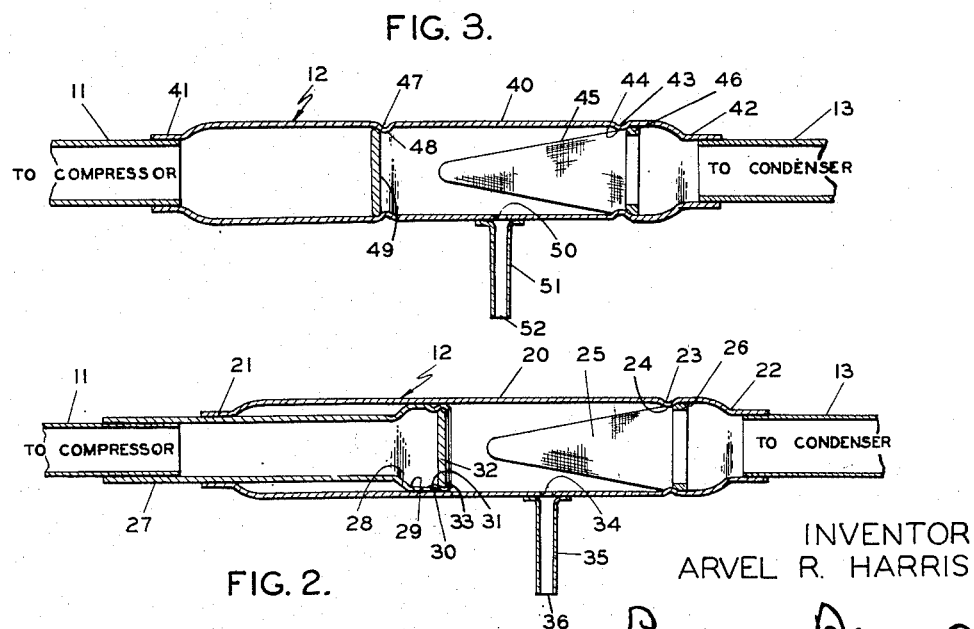
FIG. 3.
FIG. 2.
INVENTOR
ARVEL R. HARRIS
Paul O. Pippel
ATT'Y.

United States Patent Office 2,702,993
Patented Mar. 1, 1955

2,702,993

HERMETIC CONNECTOR

Arvel R. Harris, Evansville, Ind., assignor to International Harvester Company, a corporation of New Jersey Application July 24, 1951, Serial No. 238,245

8 Claims. (Cl. 62—115)

This invention relates to refrigerating apparatus but more particularly to a connector coupling of the hermetic type employed to facilitate connecting a refrigerant compressor into a refrigerant liquifying system.

In the conventional household refrigerator and freezer chest the refrigeration apparatus incorporated therein is usually purged of excess non-condensibles, moisture and foreign material and the system charged with refrigerant and hermetically sealed at the time of assembly in the fabricating plant, so that such apparatus ordinarily operates trouble-free for considerable periods of time. At times, however, mechanical failures of one form or another necessitate repair and even replacement of such apparatus which, if the entire refrigerating cabinet has to be removed to a repair or service station, may result in considerable inconvenience to the user. The modern practice, however, generally involves only replacement of the defective component with a service replacement or exchange unit, and the work incident thereto is usually done on the spot. With this procedure the refrigerating apparatus is out of operation only a very limited time and the owner suffers a minimum of inconvenience. Furthermore, damage to food products stored in the refrigerated cabinet is thus held to a minimum.

The foregoing practice, however, introduces certain problems which the present invention very satisfactorily overcomes, and, furthermore, does so in a very economical manner. Whenever a repair or replacement of such character is made it is most frequently necessary to disturb the hermetic seal of the refrigeration circuit, thus exposing the interior thereof, and usually the refrigerant itself, to contact with outside atmosphere which may contain foreign matter and a moisture content far in excess of that recommended for satisfactory operation of modern refrigerating apparatus. Because of this it is most desirable that the apparatus, upon reassembly after completion of the repair or replacement, be recharged with new lubricant and refrigerant and the system purged in an effort to remove excess moisture and any foreign matter therefrom. This, of course, is an exacting and difficult operation even when performed under ideal conditions and with the best of purging facilities available, but, it is even more difficult and far less practicable to obtain satisfactory results when such apparatus is charged and purged in the field where only limited facilities for such operations are available. As a consequence many refrigeration units so worked upon frequently fail at a later date for reasons which appear directly attributable to or resulting from some phase of the repair operation.

In order to overcome such difficulties in the past the individual component, such as the compressor, condenser or evaporator provided as a replacement or service unit in repairs of this character, was frequently charged with the proper amount of refrigerant and lubricant at the factory or service station and then purged and equipped with a two-way valve on each outlet thereof so as to facilitate its ready connection into, and the subsequent field purging of the refrigerating system undergoing repairs. However, the valves heretofore employed for such purpose have not been entirely satisfactory primarily because they depend upon a clamp-type seal which, on occasion, has a tendency to leak. In modern refrigeration systems where the amount of the refrigerant charge is very critical such leakage cannot be tolerated because faulty operation of the apparatus may follow after the component equipped with the leaky valve is connected into the system. Furthermore, such valves as have heretofore been proposed have been much too costly to fabricate.

The present invention for its principal object contemplates the provision of simple means for overcoming the difficulties heretofore enumerated in connection with repair and replacement of refrigeration apparatus, and accordingly provides a simple, inexpensive, rugged and highly effective valve-like hermetic connector for use with hermetically sealed refrigerating apparatus.

Another object includes the provision of a refrigerant conduit line connector device suitable for retention of a hermetic seal.

A further object is to provide a conduit line connector device suitable for connection in a gas and moisture tight relationship to an outlet of a refrigerant compressor and which, further, may serve for readily connecting said compressor into a refrigeration circuit.

A still further object is to provide a conduit line-connecting device adaptable for closing broken ends of refrigerant conduit lines and for connecting together different portions of a refrigerating system.

Another important object is to provide a hermetic line-connector device containing a low-melting point metal seal positioned across the passage therethrough.

A yet still further object is to provide a valve-like connector, suitable for closing the broken ends of a refrigerant conduit, and having a simple, highly effective yet easily disturbed or broken sealing means therein for sealing off or obstructing a fluid passage therethrough.

The foregoing and other objects and features of the invention will become apparent as the disclosure is more fully made in the following detailed description of a preferred embodiment of the invention as illustrated in the accompanying drawings in which:

Figure 1 is a diagrammatic view of a refrigeration system wherein the proposed invention has been incorporated and shown as affixed to the compressor component thereof.

Figure 2 is an enlarged vertical longitudinal sectional view of a preferred embodiment of the valve connector device of the proposed invention.

Figure 3 is an enlarged vertical longitudinal sectional view of a modified form of the valve connector device of the proposed invention.

A preferred application of the present invention envisages the incorporation of the device in a conventional refrigeration circuit which, for purposes of simplicity and as illustrated particularly in Figure 1, has been shown substantially in diagrammatic form. Referring to this figure it will be noted that the discharge outlet of a hermetically sealed refrigerant motor-compressor unit, represented generally by the numeral 10, is connected by a discharge conduit 11 through a connector device 12 and conduit line 13, to a condenser 14 the outlet of which is connected to a capillary restrictor tube 15 whose opposite end discharges into an evaporator cooling unit 16, which, in turn, is connected, by a suction line conduit 17 through a connector device 12 and conduit 18, to the suction inlet of said compressor. As is well understood in the art a portion of the capillary tube 15 may be positioned in closely coupled heat exchange relation with a portion of the suction line conduit 17 as shown generally at 19.

In a preferred embodiment, as illustrated in Figure 2, the proposed connector device 12 is fashioned with a metallic tubular outer member 20 wherein the opposite ends have been swaged or otherwise drawn to provide reduced section portions as indicated, respectively, at 21 and 22. Spaced inwardly from one end of the tubular member 20 there is provided, as by spinning or the like, a peripherally extending annular recess 23 which opens outwardly and projects or extends radially inwardly into the interior of said tube to form an annular ridge-like bead or abutment 24. A substantially cone-shaped, preferably fine-mesh, filtering screen 25, having a retainer ring 26 on the open-end thereof may, if desired, be axially positioned within the tube 20 and arranged to abut the ridge 24 in a tight or snap-fit relationship so that it may be readily removed or replaced as found desirable.

Inwardly extending into the tubular member 20, from the end opposite that containing the screen 25, is a smaller, inner or second metallic tubular member 27 of a diameter such that its periphery tightly engages the inner surface of the reduced-end portion 21 of said first tube member. The inwardly projecting end portion of the tubular member 27 is flared outwardly at 28 and joins into an expanded or enlarged portion 29 whose outer diameter closely approximates that of the inner diameter of the tube member 20 so that the said two tubular members may be arranged in tightly fitting axial and concentric disposition with respect to one another. Inwardly spaced from the end of the expanded portion 29 there is provided, as by spinning or the like, a peripherally extending annular recess 30 that opens outwardly and projects or extends radially inwardly to form an annular ridge-like abutment or bead 31, and positioned in closely abutting relation against said ridge is a fusible plug-like seal or baffle element 32. The edge of said tube, preferably, is rolled or bent over, as indicated, to provide an annular flange-like retainer 33 for said sealing baffle after the plug has been fixedly positioned in the tube in sealing fashion against the abutting bead 31. Said sealing plug or baffle member 32 is fashioned from a relatively low-melting point alloy metal. Although there are many such commercial compositions that are suitable for the purpose it is preferred to use a tin-lead alloy proportioned so as to fuse at temperatures in the neighborhood of 375° F. to 500° F.

After the inner tube 27 has been positioned within the outer member 20 the two are fixedly joined, preferably by brazing, proximate the reduced-end portion 21 of said outer tube. Although a brazing temperature approximating 1150° F. may be employed in this operation it has been found that a fusible sealing plug having the fusion limits indicated will not be melted or the seal therearound disturbed by the heat of the brazing operation because of the heat dissipating properties of the tubular members; hence a gas and liquid tight seal may readily be provided for one end of the connector device 12.

Intermediate the ends of outer tubular member 20 and preferably between the fusible seal 32 and the end of the outer member 20 adjacent the screen 25 there is provided in the periphery thereof an opening 34 which connects with a short conduit 35 whose free opposite end 36 is open to the atmosphere. Although said conduit 35 may be affixed to the outer tube member by any suitable securing means it is preferred that it be fixedly positioned thereagainst by some means, such as soldering, brazing or the like, that will insure effectuation of a good, strong gas and liquid-tight joint around the opening 34. It is preferred also that such conduit be fabricated from some relatively ductile metal, such, for instance, as copper, bronze or the equivalent thereof, for reasons which will presently be more apparent.

In Figure 3 there is illustrated a modification of the proposed connector which, although functionally substantially identical with the embodiment illustrated in Figure 2, is structurally altered slightly therefrom. In this modified form the connector includes a tubular member 40 whose opposite ends are reduced to provide reduced-end portions 41 and 42. Spaced inwardly from one end thereof is an annular recess 43 and an associated inwardly projecting ridge-like abutment or bead 44 against which is tightly positioned a filtering screen 45 and a retaining ring 46. Intermediate the opposite ends of said tubular member 40 there is provided, as by spinning or the like, a peripherally extending annular recess 47 that opens outwardly and projects or extends radially inwardly to form an annular ridge-like abutment or bead 48. Positioned within said tubular member 40 and against said bead 48 in seal-tight relationship is a fusible plug-like seal or baffle member 49 which, as heretofore noted, may be fashioned from a low-melting tin-lead alloy. Although any suitable and convenient means may be used for fixedly positioning and sealing said plug in place such may readily be accomplished by the use of a back-up dam held in place through one end opening while the metal for the plug is poured in a molten state from the opposite end. After the metal of the plug has sealed itself in place against the inner wall of the tube and against the bead 48 the dam is withdrawn. Tinning the inside surface of the tubular member in the vicinity of the recess may facilitate this sealing operation since the fusible plug will more readily adhere to the abutting metallic surfaces if they have been so treated.

As in the first embodiment, there is likewise provided intermediate the ends of the tubular member 40 and preferably between the fusible seal 47 and the end of the tubular member 40 adjacent the screen 45 an opening 50 which connects with a short conduit 51 whose free or opposite end 52 is open to the atmosphere. Although said conduit may be affixed by any suitable means it has been found that soldering, brazing or the like readily provides the strong gas and liquid tight joint desired around the opening 50.

In the embodiments selected for illustration the connector of the present invention is shown as being utilized with a refrigerant motor-compressor unit component, but it should be understood that this is only for purpose of illustration since the proposed connector device is equally serviceable when applied to any one of many other individual components or assemblies of a refrigeration system, as for instance, an evaporator cooling unit or a condenser unit.

In utilizing a device of the character proposed herein with a hermetic motor-compressor unit one such connector device is applied to each of the two openings therein, viz., one each to the pressure outlet and to the suction inlet. Each connector, with its fusible plug sealed in place therein, is arranged so that the end of the connector opposite that adjacent the filtering screen is connected to a conduit which, in turn, connects to one of the two openings of the compressor unit. In one instance said conduit is the discharge conduit line 11 which connects with the pressure outlet, and in the other instance it is the suction conduit line 18 which connects with the suction inlet of the compressor. Although any suitable jointing or affixing means may be employed for securely connecting the connector to its respective conduit, which, in turn, connects with its selected opening into the compressor, it is preferred that such joints be accomplished by an operation such as brazing in order to insure a rugged and liquid-tight connection without disturbing the fusible plug or the fluid-tight seal therearound. After connectors have been secured, one onto each outlet of the compressor, the compressor unit is charged with the proper amount of lubricant and refrigerant and purged in accordance with conventional practices. Upon completion of such operation the compressor unit component is ready for shipment and installation in the field where, it is contemplated, it will be used to replace a similar component being removed for necessary repairs.

In effecting a field repair to a refrigeration system the conduit lines 13 and 17 that connect the motor-compressor unit, respectively, with the condenser and evaporator are cut and the defective unit removed and replaced with the new or factory replacement compressor unit. The free ends of the severed conduits 13 and 17, from the condenser and evaporator, respectively, are each slipped into the open end of a reduced-end section of one of the connector devices, previously affixed to the compressor openings prior to shipment, and then brazed thereto by suitable brazing means. The remainder of the refrigeration system, including the circuit through the condenser, capillary and evaporator, may then be evacuated and purged through the off-set conduits 35 or 51 after which the respective ends of said conduits are pinched off and brazed closed to effectively seal the system. Upon completion of this phase of the repair operation heat may be applied to the tubular member around the periphery thereof in the vicinity of the fusible plug element so as to cause said plug to fuse and melt away and thus break the liquid seal therearound thereby opening the connector and adjacent conduits to the free flow and circulation of refrigerant therethrough. If the inside of the tubular member has been tinned the fusible plug, after it melts, will spread out in a thin film along the bottom wall and adhere thereto and thus provide no further obstruction to free flow of refrigerant through the circuit.

From the foregoing it will be appreciated that in the present invention there is provided an inexpensive improved connector device that is readily adapted to use with hermetically sealed refrigeration apparatus, and which is capable of maintaining a hermetic seal without leakage. The connector is highly adaptable for field use and particularly for facilitating the installation of component portions of a refrigerating system when such units are repaired or replaced in the field. It is highly flexible in application in that it may be utilized with many different components of a refrigeration system. Furthermore, its use assures a properly charged refrigeration system and thereby minimizes troublesome operation from such causes.

The manner of achieving the foregoing objects and attaining the features described is believed to be clear from the preceding detailed description. Other objects and features will undoubtedly occur to those skilled in the art. Likewise certain modifications and alterations in the preferred construction disclosed may occur, all of which may be made without departing from the spirit and scope of the invention as set forth in the appended claims.

What is claimed is:

1. Means for connecting one portion of a refrigerating system containing a charge of refrigerant to another portion of a refrigerating system which comprises, an outer member adapted to be connected to one portion of a refrigerating system and an inner member adapted to be connected to the other portion of the refrigerating system, said inner member being provided with a central bore and having a fusible partition-like baffle disposed entirely within said bore and radially spaced from said outer member and arranged so as to obstruct the passage of refrigerant therethrough, and means longitudinally spaced from said baffle in said outer member to facilitate the evacuation of a portion of the refrigerating system.

2. Means for connecting one portion of a refrigerating system containing a charge of refrigerant to another portion of a refrigerating system which comprises, an elongated hollow member adapted to be connected at one end thereof to one portion of a refrigerating system and a second elongated hollow member extending partially within the opposite end of said first member and securely affixed thereto in a fluid-tight connection and having the opposite end of said second member adapted to be connected to the other portion of the refrigerating system, said first member having a filtering screen therewithin and disposed proximate one end thereof, said second member having a fusible radially extending wall disposed wholly therewithin and proximate one end thereof and arranged to restrict the circulation of refrigerant therethrough, and means disposed in said first member intermediate said screen and said wall to facilitate the evacuation of that portion of the refrigerating system connected to said first member.

3. The connector structure claimed in claim 2 further characterized by an evacuation facilitating means which includes an opening in the periphery of the first hollow member which connects by a ductile conduit with the surrounding atmosphere.

4. In a pipe coupling, a first coupling element, a second coupling element, means for securing said first and second coupling elements together, a filtering screen in said first coupling element, a fusible partition-like baffle arranged in said second coupling element and disposed wholly therewithin to restrict the passage of fluid therethrough, and conduit means disposed between said screen and said baffle and connected with said first coupling element to facilitate evacuation of the interior thereof.

5. Means for connecting one portion of a refrigerating system containing a charge of refrigerant to another portion of a refrigerating system which comprises, a longitudinal member having a central bore therewithin and adapted to have one end thereof connected to one portion of the refrigerating system and the other end connected to the other portion of the refrigerating system, said member having a fusible element arranged therein so as to obstruct the free passage of refrigerant therethrough, a filtering member positioned within said member and disposed proximate one end thereof, and means connected into said member intermediate the said filter and said fusible element to facilitate the evacuation of that portion of the refrigerating system connected to the end of said member proximate said filter element.

6. Means for connecting one portion of a refrigerating system containing a charge of refrigerant to another portion of a refrigerating system which comprises, a longitudinal member having a central bore therethrough and adapted to have one end thereof connected to one portion of the refrigerating system and the other end thereof connected to the other portion of the refrigerating system, said member having an internal radially extending annular bead and a fusible radially extending wall closely engaging said bead so as to restrict the circulation of refrigerant through the member, a filtering element positioned within said member and disposed proximate one end thereof, and means connected into said member intermediate said filtering element and said fusible wall to facilitate the evacuation of that portion of the refrigerating system connected to the end of said member nearest said filter element.

7. Means for connecting one portion of a refrigerating system containing a charge of refrigerant to another portion of a refrigerating system which comprises an outer member adapted to have one end thereof connected to one portion of a refrigerating system and an inner member extending partially within the opposite end of said first member and securely affixed thereto in a fluid-tight connection and having the opposite end of said inner member adapted to be connected to the portion of the refrigerating system containing the charge of refrigerant, said inner member being provided with a central longitudinally extending bore having a fusible element disposed entirely therewithin proximate one end thereof and arranged so as to seal off the bore against the passage of refrigerant therethrough, and conduit means connected into said outer member at a point on the surface of said member intermediate the end of said inner member that extends into said outer member and the end of said outer member that is adapted to be connected to the said one portion of the refrigerating system to facilitate the evacuation of a portion of the refrigerating system while said fusible element remains sealed in position within said inner member.

8. A refrigerating system connecting means according to claim 6 and further characterized by having the fusible radially extending wall element positioned intermediate the annular bead and the end of the longitudinal member farthest disposed from the said filtering element.

References Cited in the file of this patent

UNITED STATES PATENTS

| | | |
|---|---|---|
| 1,921,809 | Crain | Aug. 8, 1933 |
| 2,288,166 | Kucher | June 30, 1942 |
| 2,303,577 | Ottenheimer | Dec. 1, 1942 |
| 2,338,953 | Melke | Jan. 11, 1944 |